US009886261B1

(12) United States Patent
Hotchkies

(10) Patent No.: US 9,886,261 B1
(45) Date of Patent: Feb. 6, 2018

(54) SYSTEM TO PRIORITIZE UPDATE DISTRIBUTION TO DEVICES

(71) Applicant: AMAZON TECHNOLOGIES, INC., Seattle, WA (US)

(72) Inventor: Blair Livingstone Hotchkies, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 4 days.

(21) Appl. No.: 14/965,645

(22) Filed: Dec. 10, 2015

(51) Int. Cl.
*G06F 9/45* (2006.01)
*G06F 9/445* (2006.01)
*H04L 29/08* (2006.01)

(52) U.S. Cl.
CPC ............... *G06F 8/65* (2013.01); *H04L 67/16* (2013.01); *H04L 67/22* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 8,875,127 | B2 * | 10/2014 | Chan | G06F 8/61 717/172 |
| 2012/0047509 | A1 * | 2/2012 | Ben-Ltzhak | G06F 9/4881 718/103 |
| 2012/0254108 | A1 * | 10/2012 | Wedewer | H04W 4/003 707/618 |
| 2015/0178070 | A1 * | 6/2015 | Doi | G06F 8/61 717/172 |

* cited by examiner

*Primary Examiner* — Qamrun Nahar
(74) *Attorney, Agent, or Firm* — Lindauer Law, PLLC

(57) ABSTRACT

Described are techniques for prioritizing devices to receive updates to an application executing on a device. Event data indicative of use of the application, the device, and other information associated with a user is obtained. For example, event data for a user account across many different devices may be obtained. Deployment parameters may specify how an update is to be distributed, such as maximum number of devices to deploy to, timing of deployment, and so forth. Based on the event data and the deployment parameters, a subset of the devices executing the application are selected. The update may then be distributed to the subset.

20 Claims, 9 Drawing Sheets

SYSTEM TO PRIORITIZE UPDATE DISTRIBUTION TO DEVICES

BACKGROUND

A wide variety of devices utilize computer-executable instructions to perform many tasks. Smartphones, tablets, embedded devices, vehicles, and so forth may be able to receive files that provide updates to fix errors, add new functionality, or make other changes to how those devices operate.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
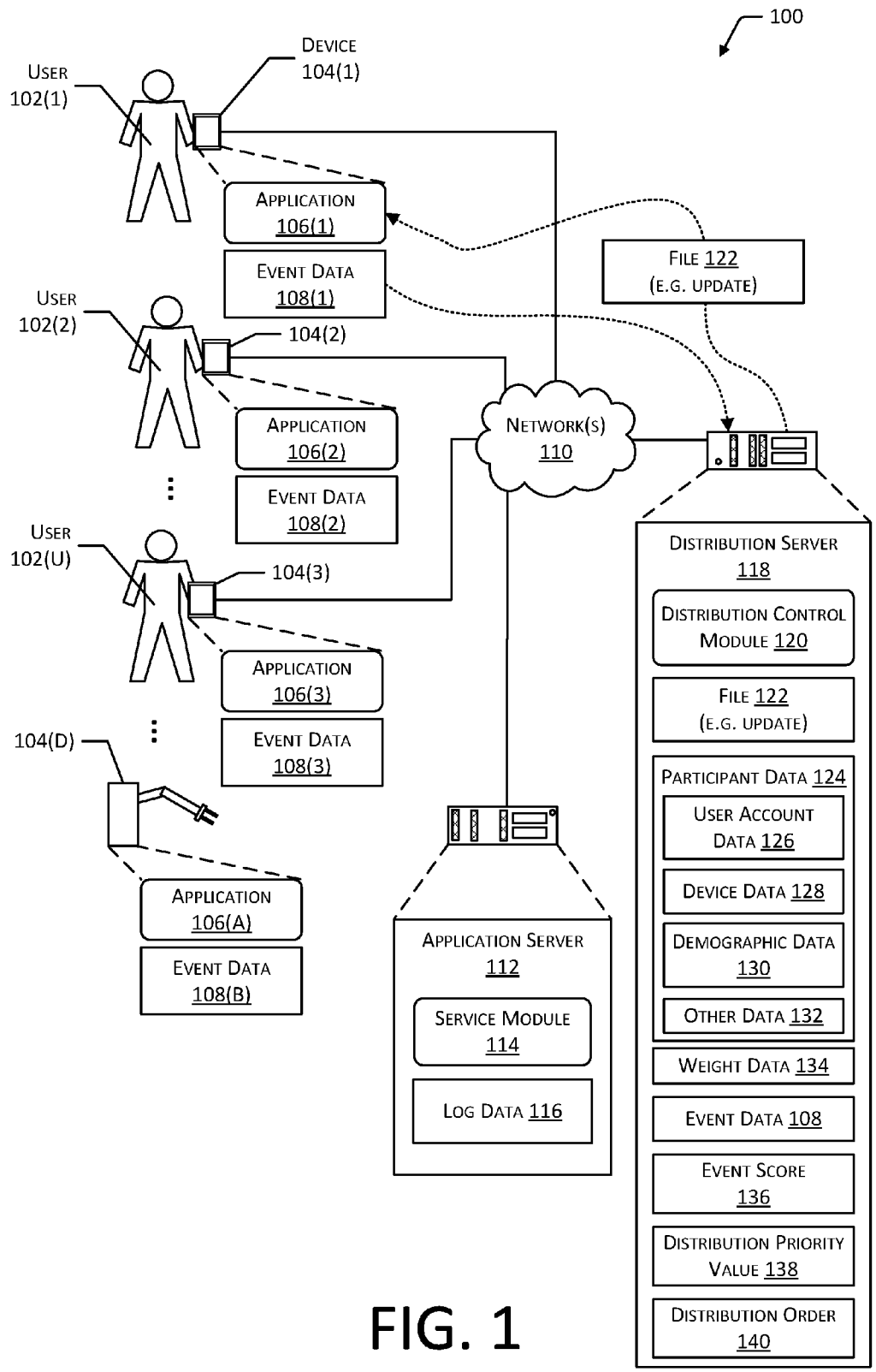
FIG. 1 depicts a system for determining and distributing a file to one or more devices, according to one implementation.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Computer-executable instructions are used to direct the operation of a wide variety of devices including but not limited to consumer electronics, vehicles, test equipment, embedded devices, and more. These instructions may be known as software, firmware, microcode, drivers, applications, plugins, and so forth. During the life of a device, changes to these instructions may be distributed as updates. These updates may correct previous errors in the instructions, add new functions, remove existing functions, improve efficiency of operation, and so forth. Updates may be provided as one or more files that may be processed by a device to modify the computer-executable instructions that have been previously stored. These updates may be distributed to a particular device using a network, transfer of physical media, and so forth.

As a number of devices that are deployed for use increases, it may become infeasible or undesirable to simultaneously provide a file that contains an update to all devices simultaneously. For example, the distribution server may have insufficient bandwidth and processing capability to simultaneously connect with millions of devices. In another example, a system administrator may wish to control the distribution of the file to allow time for acquisition of feedback about the file and the resulting impact on devices that have used the file.

Traditional systems have addressed the issue of controlling distribution by using techniques such as beta testers who explicitly opt in to participate, random selection, or sequentially by item identifier. However, these systems may provide a less than optimal user experience. For example, the user of the device may not wish to be a beta tester for every update. In another example, random selection does not accommodate users who might benefit from the update sooner rather than later.

Described in this disclosure are techniques to use event data at least in part to determine a distribution order. Based on the distribution order, a file may be provided to a device or user. The device may then use the file to update one or more of the computer-executable instructions associated with the device, such as those stored in computer-readable storage media on board the device.

The event data may be indicative of one or more actions by the user, operation of the device, and so forth. The event data may be associated with a particular user account, particular device, particular network accessible service access by one or more of the user account or particular device, and so forth. For example, the event data may be indicative of user input to repeatedly access a check for updates function with respect to a particular application. The event data may indicate the access of the particular function (a check for updates), data indicative of a frequency (more than 3 inputs to activate this feature in a 5 minute period).

The event data may be used to generate an event score. For example, a numeric value may be associated with the frequency that a particular behavior occurs within the predetermined interval of time. In some implementations, weight data may be used to associate a particular weight value with a particular type of event data. Continuing the example above, the type of event data associated with the check for updates function may have a weight value of 80 while a type of event data associated with using another application that provides similar functionality may have a weight value of 25. The numeric value representative of the event data may be multiplied by the weight value to generate the event score.

In some implementations, the event score may be used to generate a distribution order. For example, the higher the event score the greater the priority to distribute the file to a device associated with the particular user account. In other implementations, the event score and a distribution priority value may be used to determine the distribution order. The distribution priority value may specify that a first user account having particular demographic data is given greater priority than a second user account having different demographic data. For example, the file may be associated with a fix that affects users within a particular country. The demographic data may indicate that the first user account is associated with an address within the particular country.

The distribution order may be configured to maintain a particular ratio or statistical composition. For example, the distribution order may be configured to contain a certain percentage of user accounts that receive priority for distribution of the file, while maintaining another percentage of non-priority user accounts.

By using the techniques described in this disclosure, the distribution of files that may affect one or more of the computer executable instructions on one or more devices may be controlled more effectively. Those devices or users that might benefit most from early deployment of the file may be provided with the file more quickly than otherwise available using conventional techniques. Security may be improved by more rapidly distributing security-related files to devices in sensitive or high-security application. By using the techniques described, overall time to distribute the file and correct any issues associated with it are reduced. For example, the file may be distributed to an initial group of users from whom information about any problems may be obtained. Once this information is obtained, corrections may be made, and subsequently deployed. This may reduce overall rollout time to the devices affected by the file, which may further improve one or more of the operation, efficiency, or security of the devices.

Illustrative Systems

FIG. 1 depicts a system 100 for determining and distributing a file to one or more devices, according to one implementation. A plurality of users 102(1), 102(2), . . . , 102(U) are depicted. Unless otherwise indicated, letters within parentheses such as "(U)" are indicative of an integer value that is greater than zero. One or more of the users 102 may use one or more devices 104(1), 104(2), . . . , 104(D). For example, user 102(2) may use device 104(2). The devices 104 may include, but are not limited to smart phones, tablets, embedded devices, vehicles, industrial controls, test equipment, home automation controllers, robots, drones, computer controlled production equipment, and so forth. For example, the robots may comprise robots used in an industrial, commercial, or residential setting. The drones may comprise mobile mechanisms, such as used to deliver packages, provide a sensor platform for gathering information, act as a communication access point, and so forth.

In some implementations, the devices 104 may not be associated with a particular user 102. For example, the device 104 may comprise a wireless network access point, an embedded controller within an elevator, and so forth.

The device 104 may execute one or more applications 106. The applications 106 may comprise one or more computer executable instructions stored by a computer readable storage media. The application 106 may comprise an operating system or components thereof, a driver, a program, and so forth. Event data 108 may be acquired at the device 104. For example, the event data 108 may comprise information indicative of usage of the application 106, frequency of usage, inputs made by the user 102, sensor data obtained by one or more sensors of the device 104, and so forth. For example, the event data 108 may indicate that the user 102 attempted to access a particular function of the application 106 several times within a particular interval of time. The event data 108 may comprise information ordered in, or representative of, a time series. For example, the event data 108 may comprise information about inputs made by the user 102 as arranged by time of the inputs or sequence of those inputs.

The device 104 may have a network interface that is able to connect to one or more networks 110. During operation, the application 106 may communicate with an application server 112 by way of the network 110. For example, the application 106 may request information or send input to the service module 114 executing on the application server 112. The service module 114 may perform one or more operations responsive to the request. In some implementations, the application server 112 may be configured to generate log data 116. The log data 116 may be indicative of operation of the service module 114 or other modules of the application server 112 resulting from an interaction with the application 106 executing at least in part on the device 104. For example, the log data 116 may indicate that the application 106 executing on the device 104 made a request for a particular function to be performed by the service module 114.

The device 104 may also be able to communicate with the distribution server 118 by way of the network 110. The distribution server 118 may include a distribution control module 120 that is configured to provide a file 122 to the device 104. For example, the distribution control module 120 may be configured to send or initiate the sending of the file 122 to one or more of the devices 104 using the network 110. The file 122 may comprise computer executable instructions that modify computer executable instructions that have been previously stored and used by the device 104. For example, the file 122 may comprise an update, patch, revision, rollback, and so forth, for the application 106. Continuing the example, the file 122 may include one or more bug fixes that change the computer executable instructions of the application 106. In one implementation, the device 104 may process the file 122 to implement the changes. In another implementation, a third-party device may process the file 122 and make the changes to the executable instructions stored in computer readable storage media associated with the device 104.

The distribution server 118 may have access to participant data 124. The participant data 124 may include user account data 126, the device data 128, demographic data 130, or other data 132. The user account data 126 may include information about a user account, information about one or more individual users 102 associated with the user account, devices 104 that are associated with the user account, and so forth. For example, the user account data 126 may include a user account identifier, a real name associated with the user account, a payment mechanism associated with the user account, and so forth.

The device data 128 comprises information about one or more of the devices 104. For example, the device data 128 may include information such as a device identifier, make of the device, model of the device, version of the application 106 that is installed on the device 104, geolocation of the device 104, and so forth.

The demographic data 130 may comprise information about a user 102. For example, the demographic data 130 may be associated with a particular user account. Demographic data 130 may include information including, but not limited to, a date the user account was established, age of the user, geographic location associated with the user, occupation of the user, gender of the user, marital status, number of dependents, location of employment, job title, security clearance, agency affiliation, and so forth. For example, the age of the user may be determined based on the calendar date of a birthday.

The other data 132 may include information such as social graph data. This is described in more detail below with regard to FIG. 2.

The distribution control module 120 may obtain or otherwise access event data 108 provided by one or more the devices 104. For example, the distribution control module 120 may receive the event data 108 from a data collection server (not shown) that polls the application 106 to send the event data 108 to the data collection server.

The distribution server 118 may also store or otherwise access weight data 134. The weight data 134 may provide one or more weight values that are associated with particular types of event data. The weight data 134 as described in more detail below with regard to FIG. 2. The weight data 134 may be used to generate one or more of the event score 136 or the distribution priority value 138.

The distribution control module 120 may use one or more of the participant data 124, the weight data 134, or the event data 108 to generate an event score 136. The event score 136 may comprise a numeric value indicative of a behavior by one or more of the user 102 (or the user account associated there with) or the device 104. For example, the event data 108 may indicate that the device 104 has received three requests for a check for update in the last five minutes. The event data 108 may be associated with a particular user account. The "check for update" type of behavior may be associated with a value of 15 per occurrence. The event score 136 may be determined as a product of the frequency and per occurrence value. For example, the three updates with a value of "15" each may result in event score 136 of 3×15 or 45.

In some implementations, the distribution control module 120 may use information about the file 122 to process the event data 108. For example, the file 122 may be associated with updating a first portion of the application 106. Based at least in part on this information, the distribution control module 120 may filter the event data 108 to search for those devices 104 that are using the first portion of the application 106. In another implementation, the distribution control module 120 may generate an event score 136 that is greater when the event data 108 indicates that the function of the application 106 that is associated with the file 122 has been used, was attempted to be used, and so forth.

The event score 136 may be used to generate the distribution priority value 138 based at least in part on the weight data 134. For example, the weight data 134 may indicate a particular weight value that may be used as a multiplier for a particular type of event data. Continuing the example above, the "check for update" type of behavior may have a weight value of 80. The distribution priority value 138 may comprise the product of the event score 136 and the weight value, such as 45×80=3600. In other implementations, other calculations may be used to determine the distribution priority value 138.

The distribution priority values 138 that are associated with one or more of the user account, or particular device 104 may be used to determine a distribution order 140. The distribution order 140 comprises information indicative of a sequence in which particular devices 104 will be sent the file 122. For example, the distribution order 140 may indicate that device 104(1) is to receive the file 122 before device 104(1975). In some implementations, the distribution order 140 may also be based at least in part on one or more distribution parameters. The distribution parameters may allow for consideration of other attributes in the determination of the distribution order 140. These attributes may include geography, device type, generation of feedback with respect to operation of the application 106, and so forth. For example, the distribution parameters may specify particular ratio of high-priority to low priority devices 140, particular percentages of devices 104 in particular geographic locations, and so forth. In one implementation, the distribution parameters may specify the particular attributes of the participant data 124 are to receive special consideration. For example, the distribution parameters may specify that a first type of device 104 is indicated by the device data 128 is to receive the file 122 before a second type of device 104.

In one implementation, the distribution order 140 may be updated on an ongoing basis by the distribution server 118. For example, as additional event data 108 is received over time, the distribution order 140 may change. In another implementation, the distribution order 140 may be generated based on the information available at a particular time, and then remain unchanged until the file 122 has been distributed to all the devices 104 indicated in that particular version of the distribution order 140.

In some situations, the placement of a particular user account or device within the distribution order 140 may be deprecated to decrease the priority for receipt of the file 122. For example, additional event data 108 or other information may be received that results in a decrease in the distribution priority value 138 associated with a particular device 104.

By using the distribution control module 120 to determine the distribution order 140, the users 102 may experience an overall improvement in satisfaction with use of the application 106. For example, users 102 that frequently use a particular function of the application 106 may receive the file 122 that updates that particular function more quickly than those users 102 who do not use the particular function at all.

Figure 2:
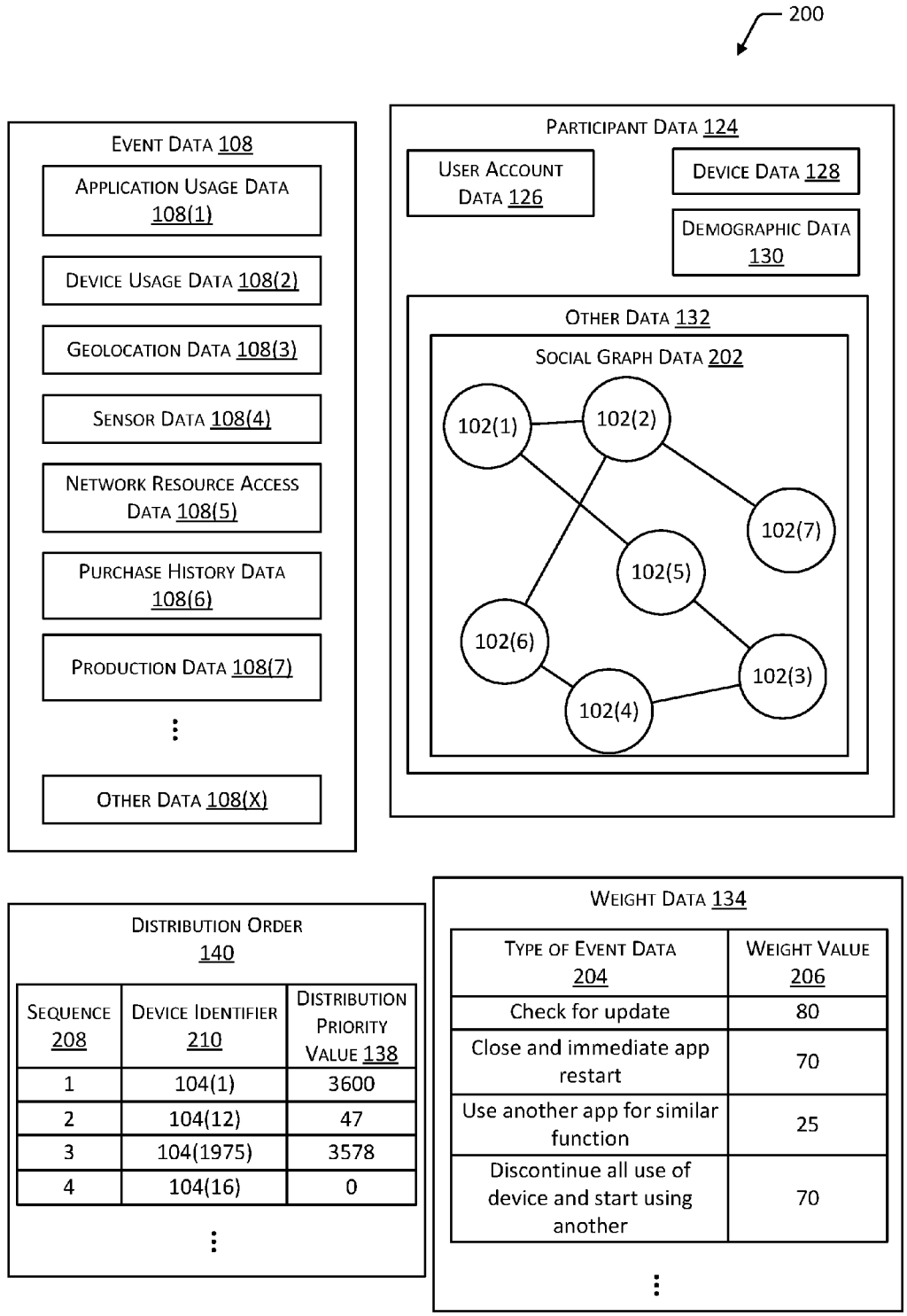
FIG. 2 depicts block diagrams of various data associated with the system, according to one implementation.

FIG. 2 depicts block diagrams 200 of various data associated with the system, according to one implementation.

Event data 108 is depicted. The event data 108 may include application usage data 108(1). The application usage data 108(1) comprises information indicative of operation of the application 106. For example, the application usage data 108(1) may include information about calls made to the application 106, calls made by the application 106, information about particular code paths within the application 106 that were utilized, register values associated with the application 106, debugging information associated with the application 106, and so forth.

The event data 108 may include device usage data 108(2). The device usage data 108(2) comprises information indicative of operation of the device 104. For example, the device usage data 108(2) may include processor usage statistics, memory usage statistics, information about processes currently executing, and so forth.

The event data 108 may include geolocation data 108(3). The geolocation data 108(3) may comprise information indicative of geographic location of one or more of the user 102 or the user device 104. For example, the geolocation data 108(3) may be obtained from a cellular data network that provides access to the network 110 to the device 104. In another example, the geolocation data 108(3) may be obtained using components on board or in communication with the device 104. For example, when the device 104 comprises a vehicle, a global positioning system device onboard the vehicle may provide the geolocation data 108 (3). The geolocation data 108(3) may be indicative of the geolocation at a particular time, or a path over time.

The event data 108 may include sensor data 108(4). The sensor data 108(4) may include information from sensors such as proximity sensors, motion sensors, accelerometers, gyroscopes, switches, and so forth. For example, the sensor data 108(4) may comprise motion data obtained from an accelerometer on board device 104.

The event data 108 may include network resource access data 108(5). The network resource access data 108(5) comprises information associated with access or use of the network 110, the application server 112, and so forth. In some implementations, the network resource access data 108(5) may be indicative of the use of particular credentials that are associated with the first user account. For example, the network resource access data 108(5) may indicate that the application 106 has made several service requests to the service module 114 of the application server 112 using a particular authorization token. In some implementations, the log data 116 obtained by the application server 112 may be indicative of the network resource access data 108(5).

The event data 108 may include purchase history data 108(6). The purchase history data 108(6) may comprise information such as previous purchases associated with one or more of the user account or the device 104. For example, the purchase history data 108(6) may be indicative of the particular items, types of items, category of items, ship to addresses, and so forth associated with a particular user account.

The event data 108 may include production data 108(7). The production data 108(7) may comprise information about operation or output of a system that uses one or more of the devices 104. For example, a factory may use robot devices 104 to pick and place parts on a circuit board. The production data 108(7) may comprise information about failures of particular robots, information about throughput of a particular robot, quality control data associated with the product, overall throughput of facility, and so forth. For example, the production data 108(7) may indicate that robot 104(11) has a defect rate in produced circuit boards of incomplete placement of 10 defective circuit boards per 1000 circuit boards produced. This may be compared to a threshold such as allowing a defect rate of only 2 failures per 1000 circuit boards produced. Based at least in part on this production data 108(7) that indicates the defect rate is too high, the distribution control module 120 may prioritize distribution of the file 122 to robot 104(11).

In another example, the production data 108(7) may be used to determine that a particular robot 104(17) is a bottleneck in the production workflow. As a result, the distribution control module 120 may prioritize distribution of the file 122 to robot 104(17). In yet another example, the same information of the bottleneck may be used to decrease the placement of the robot 104(17) in the distribution order 140 to deliver the file 122 after the other robots 104 that are upstream in the production workflow of the bottleneck.

The event data 108 may also include other data 108(X). For example, the other data 108(X) may include information such as settings made to home automation equipment such as thermostat settings, light settings, and so forth.

As described above, the participant data 124 may include one or more of the user account data 126, the device data 128, the demographic data 130, or the other data 132. In some implementations, the other data 132 may include social graph data 202. The social graph data 202 may comprise information indicative of an association between one user account and another, one device 104 and another, and so forth. For example, the social graph data 202 may indicate that user 102(1) works with user 102(2), and that user 102(2) in turn is friends with user 102(7).

The social graph data 202 may include information about the users associated with the user accounts in the social graph. For example, the social graph data 202 may indicate a location of employment, job title, security clearance, agency affiliation, and so forth. This information may be used by the distribution control module 120 to determine the distribution order 140. For example, the distribution control module 120 may generate a distribution order 140 for the file 122 affecting information security that prioritizes users employed by the State Department and located at embassies.

The social graph data 202 may include other information about the effect of a particular user account with another. For example, the social graph data 202 may include data that indicates a particular user account is an influencer of others in the social graph. For example, the social graph 202 is affiliated with several thousand users. The social graph data 202 may also indicate that the users affiliated with the influencer engage in behaviors responsive to the influencer. For example, the influencer may send messages to the affiliated users about a product, and sales of that product may increase. This information may be used by the distribution control module 120 to determine the distribution order 140. For example, the distribution control module 120 may generate a distribution order 140 for a file 122 that gives priority to the influencer for distribution of an update that provides new features to the application 106. In this way, the influencer may provide an avenue for information about the file 122 to others, potentially generating interest in the file 122 by other users 102.

In some implementations, the social graph data 202 may be obtained based on information provided by the user 102 to a social networking site. The social graph data 202 may be visualized as a series of vertices connected by edges. A distance between two elements of the social graph, such as users 102, may be determined by counting the number of edges between a first user 102 and a second user 102.

As described above, in some implementations, the distribution control module 120 may use weight data 134 to generate the distribution priority value 138. The weight data 134 may include information indicative of a type of event data 204 and associated weight value 206. For example, type of event data 204 indicative of a "check for update" may have a weight value 206 of "80". Other types of event data 204 may have other weights. In some implementations, the same type of event data 204 may have different weight values 206 based at least in part on other information, such as demographic data 130, device data 128, and so forth. For example, the "check for update" behavior on a first type of device 104 such as a smart phone to receive input from the user may have a greater weight value 206 than the "check for update" behavior from a headless device 104 such as an embedded device that generates a "check for update" automatically.

In other implementations, the weight value 206 may be expressed in other terms. For example, the weight value 206 may comprise the mathematical functions, a percentage, and so forth.

Also depicted in FIG. 2 is an illustration of the distribution order 140. A sequence 208 indicates the overall priority with which the file 122 or a notification about the file 122 is to be distributed. A device identifier 210 provides information indicative of a particular device 102 that is to receive the file 122. The distribution priority value 138 is also depicted. In some implementations, the distribution order 140 may include devices 104 or user accounts that may have a distribution priority value 138 below a threshold. Furthermore, the sequence 208 may not be based only on the distribution priority value 138. For example, low priority devices 104 may be interspersed with high-priority devices to allow for a system administrator to gain feedback associated with the use of the file 122 under different usage conditions. As illustrated here, at sequence number 208(2) and 208(4), devices 104(12) and 104(16) have very low distribution priority values 138 relative to devices 104(1) and 104(1975), yet they appear in the top four devices 104 to receive the file 122. The insertion of these low distribution priority values 138 may be based at least in part on the distribution parameters.

The various data depicted in this figure and elsewhere in this application are shown in tabular format for ease of illustration, and not necessarily as a limitation. In other implementations, other data structures may be used to store this or other information. For example, instead of tabular data the information described may be stored in linked lists.

Figure 3:
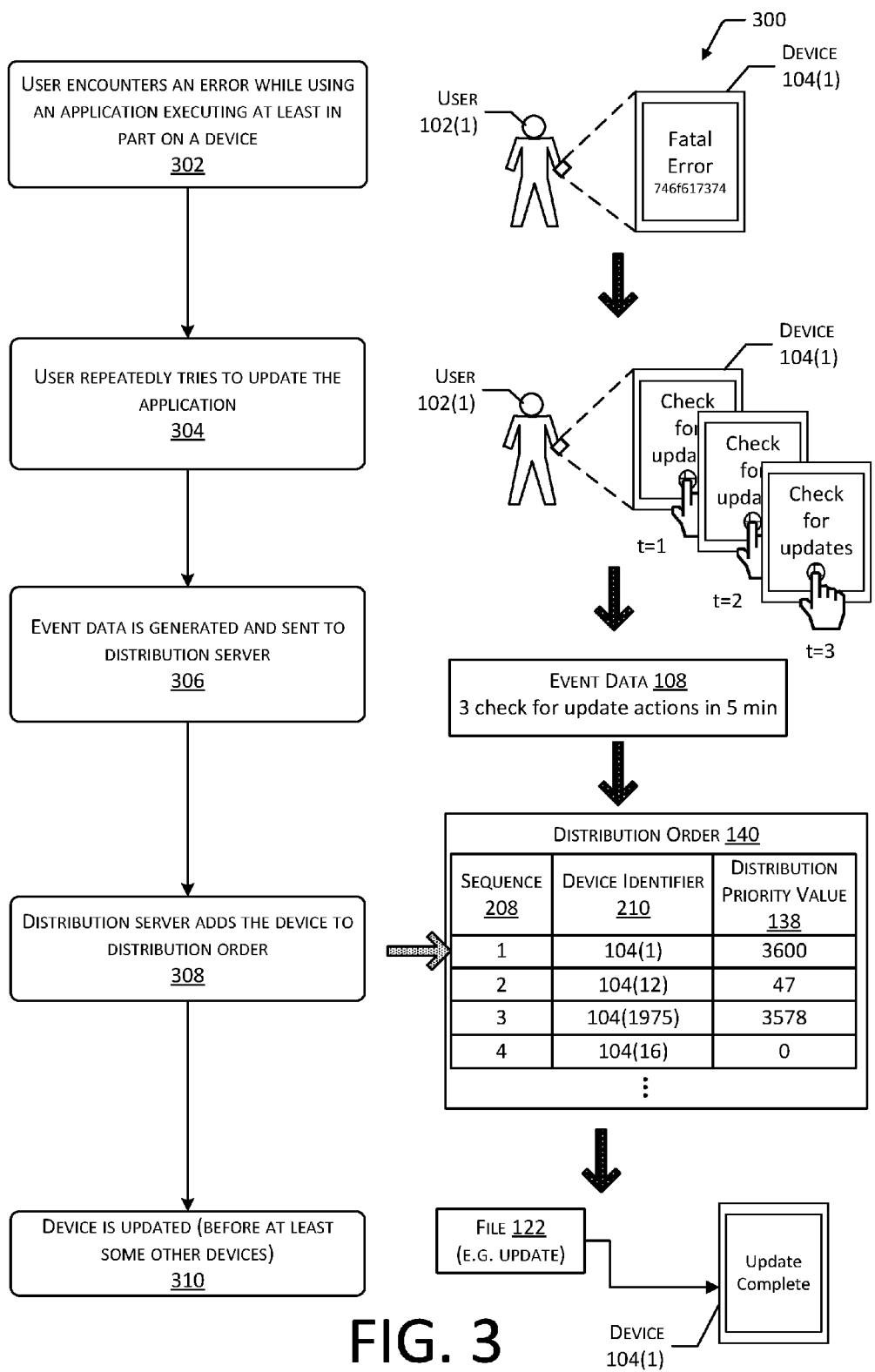
FIG. 3 illustrates a scenario in which event data is used to determine distribution order, according to one implementation.

FIG. 3 illustrates a scenario 300 in which event data 108 is used to determine distribution order 140, according to one implementation. At 302, the user 102 encounters a fatal error while using the application 106 executing at least in part on the device 104.

At 304, the user 102 may engage in the behavior of repeatedly trying to update the application 106. For example, the user 102 may navigate to a portion of the user interface associated with the application 106 that includes a control to check for updates.

At 306, event data 108 is generated. For example, the event data 108 may indicate that there have been three "check for update" actions calling on the functionality of the application 106 that interrogate the application server 112 to determine if a file 122 is available. In some implementations, the event data 108 may include information indicative of a span of time or time interval for which the event data 108 was obtained.

The event data 108 may comprise information that may be used to decrease the distribution priority value for the device 104. For example, the user 102 may perform three "check for update" actions in five minutes, but after this initial set of events, takes no further action for at least several weeks. Based on this lack of further events, it may be determined that the user 102 is not eligible for higher priority in distribution.

At 308, the distribution server 118 processes the event data 108 using the distribution control module 120 and generates the distribution order 140. For example, based on the recently received event data 108, the device 104(1) that originated that event data 108 may now have a distribution priority value 138 that moves it to a sequence number of 1, indicating it is first to receive the file 122 or a notification about distribution of the file 122.

At 310, the distribution control module 120 sends the file 122 to the device 104(1), preferentially over the other devices 104 based on the distribution order 140. As a result, the user 102(1) experiences the benefits of the file 122 that may update the application 106 that was generating the fatal error.

Figure 4:
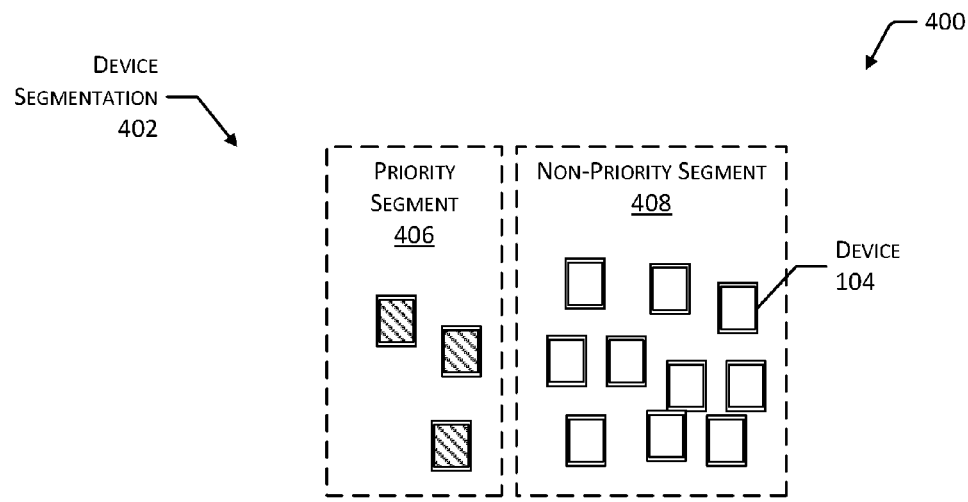
FIG. 4 illustrates segmentation of devices and users in particular priority ratios, according to one implementation.
Figure 4:
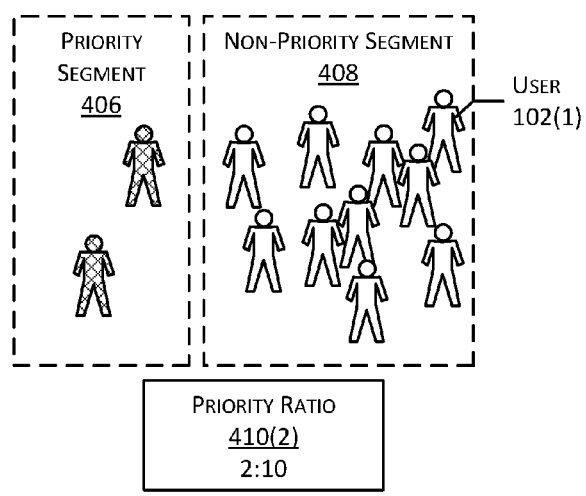

FIG. 4 illustrates segmentation 400 of devices 104 and users 102 in particular priority ratios, according to one implementation. Depicted is a device segmentation 402 and a user account segmentation 404.

In some implementations, the distribution order 140 may be generated based on information associated with particular devices 104. For example, the devices 104 serviced by the distribution server 118 may be divided based at least in part on the distribution priority values 138 into a priority segment 406 and a non-priority segment 408.

The priority segment 406 may comprise those devices 104 that are associated with a distribution priority value 138 that exceeds a threshold value. In some implementations, the distribution order 140 may be adjusted to maintain a desired distribution parameter, such as a priority ratio 410. The priority ratio 410 may specify the number of devices in the distribution order 140 that are members of the priority segment 406 and those that are members of the non-priority segment 408. For example, the priority ratio 410(1) for the device segmentation 402 maybe 3:10.

As described above, the distribution priority values 138 may be determined using event data 108, such as the application usage data 108(1), the device usage data 108(2), the geolocation data 108(3), the production data 108(7), and so forth. For example, a fulfillment center comprising a warehouse in a hot climate where users 102 employ portable devices 104 to scan items for shipment to customers. A particular item may have a barcode label that fades due to exposure to heat. As a result, the users 102 at that fulfillment center may have trouble scanning that particular item with the device 104. This may result in an unusually high rescan rate associated with the particular item. The file 122 may provide an update to improve reading of these faded labels. The priority segment 406 may be configured to include those devices 104 located at the geolocation data 108(3) of the fulfillment center and that have production data 108(7) indicating a rescan rate that exceeds a threshold value. Other devices 104 at the same fulfillment center that do not show the same production data 108(7) may remain in the non-priority segment 408. For example, devices 104 used by dispatchers handling entire trucks would remain in the non-priority segment 408 as their production data 108(7) does not include scanning individual items.

In some implementations, the distribution order 140 may be generated based on information associated with particular user accounts or users 102. For example, the user accounts may be divided based at least in part on distribution priority values 138 into the priority segment 406 and the non-priority segment 408. As described above, designation of a particular user account as belonging to the priority segment 406 may be based on the distribution priority value 138 exceeding a threshold value. The priority ratio 410(2) associated with user account segmentation 404 may be different from the priority ratio 410(1) associated with device segmentation 402. For example, the priority ratio 410(2) associate with the user account segmentation 404 is 2:10.

In some implementations, the distribution control module 120 may use one or more of device segmentation 402 or user account segmentation 404 at a given instance. For example, there may be a segmentation based on particular types of devices that is further segmented based on user account.

By deploying the file 122 to the priority segment 406 several important advantages may be realized. Information security may be improved. For example, users sensitive to information security issues may more quickly receive the file 122 that provides bug fixes for the particular application 106 and associated functions that they use. As a result, vulnerabilities may be more quickly remedied.

Overall time to deploy the file 122 to all of the devices 104 may be reduced. For example, by deploying to the priority segment 406 first, feedback such as bug data indicative of errors in the application after installation of the file 122 may be more quickly obtained from those devices 104 and used to revise the file 122, which may then be subsequently distributed. As a result, the overall time spent with debugging and distribution may be reduced. This reduction in time may improve the operation of those devices 104 and the experience of the users 102.

Figure 5:
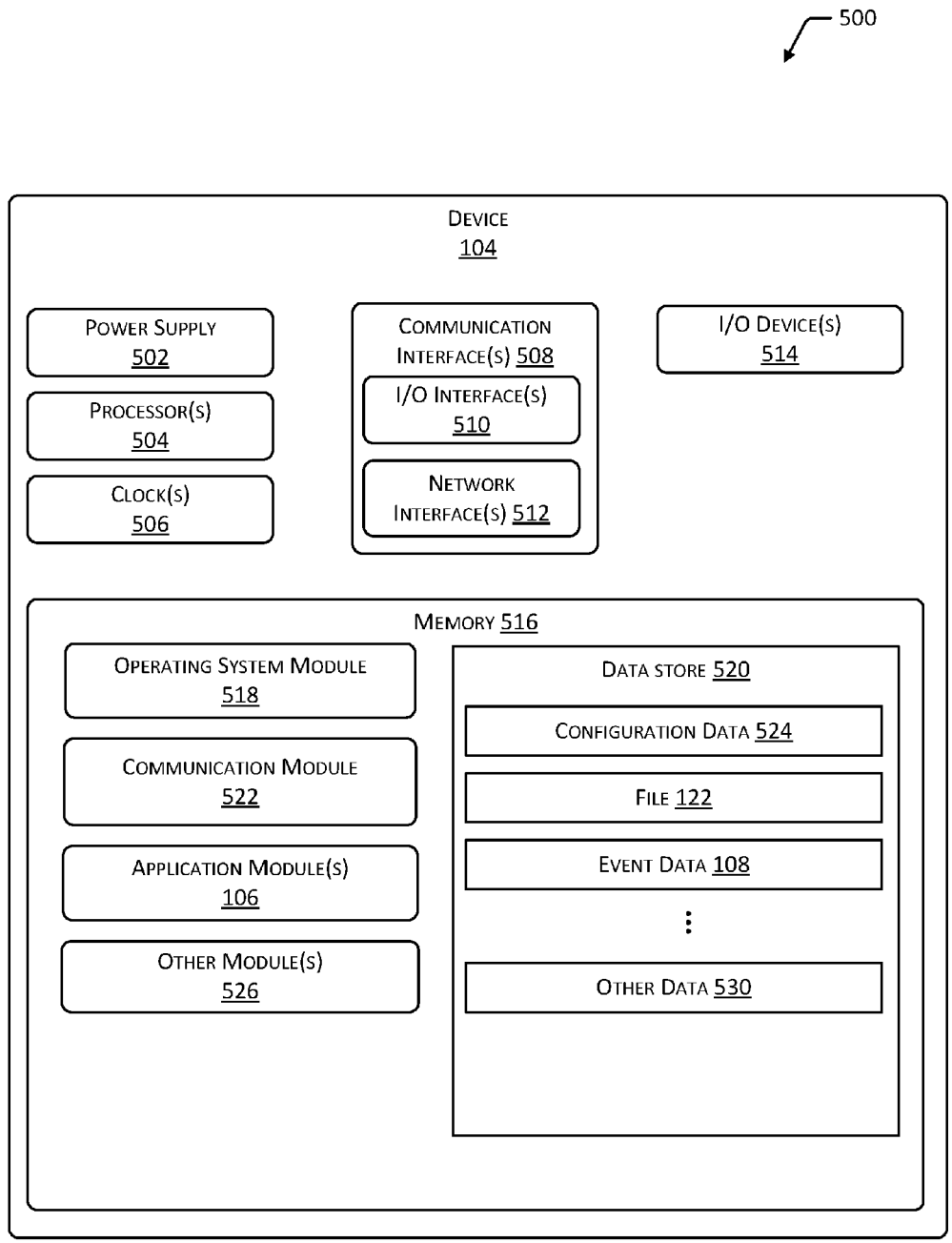
FIG. 5 is a block diagram of a device within the scope of the present disclosure, according to one implementation.

FIG. 5 is a block diagram 500 of a device 104 within the scope of the present disclosure, according to one implementation. The device 104 may include one or more power supplies 502 configured to provide electrical power suitable for operating the components of the device 104. In some implementations, the power supply 502 may include a rechargeable battery, fuel cell, photovoltaic cell, power conditioning circuitry, line power, and so forth.

The device 104 may include one or more hardware processor(s) 504 (processors) configured to execute one or more stored instructions. The processor(s) 504 may include one or more cores. One or more clocks 506 may provide information indicative of date, time, ticks, and so forth. For example, the processor(s) 504 may use data from the clock 506 to generate a timestamp, trigger a preprogrammed action, determine the time associated with event data 108, and so forth.

The device 104 may include one or more communication interfaces 508, such as input/output (I/O) interfaces 510, network interfaces 512, and so forth. The communication interfaces 508 may enable the device 104, or components of the device 104, to communicate with other devices 104 or components of the other devices 104. The I/O interfaces 510 may include interfaces such as Inter-Integrated Circuit (I2C), Serial Peripheral Interface (SPI) bus, Universal Serial Bus (USB) as promulgated by the USB Implementers Forum, RS-232, and so forth.

The I/O interface(s) 510 may couple to one or more I/O devices 514. The I/O devices 514 may include any manner of input device or output device associated with the device 104. For example, I/O devices 514 may include touch sensors, keyboards, mouse devices, microphones, image sensors (e.g., cameras), scanners, displays, speakers, haptic devices, printers, and so forth. In some implementations, the I/O devices 514 may be physically incorporated with the device 104 or may be externally placed.

The network interfaces 512 may be configured to provide communications between the device 104 and other devices, such as the I/O devices 514, routers, access points, and so forth. The network interfaces 512 may include devices configured to couple to one or more networks including local area networks (LANs), wireless LANs (WLANs), wide area networks (WANs), wireless WANs, and so forth. For example, the network interfaces 510 may include devices compatible with Ethernet, asynchronous transfer mode (ATM), frame relay, Wi-Fi, Bluetooth, ZigBee, Z-Wave, 5G, 4G, LTE, and so forth.

The device 104 may include one or more busses or other internal communications hardware or software that allows for the transfer of data between the various modules and components of the device 104.

As shown in FIG. 5, the device 104 may include one or more memories 516. The memory 516 may include one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 516 may provide storage of computer-readable instructions, data structures, program modules, and other data for the operation of the device 104. A few example modules are shown stored in the memory 516, although the same functionality may alternatively be implemented in hardware, firmware, or as a system on a chip (SoC).

The memory 516 may include one or more operating system (OS) modules 518. The OS module 518 may be configured to manage hardware resource devices such as the I/O interfaces 510, the network interfaces 512, the I/O devices 514, and to provide various services to applications or modules executing on the processors 504. The OS module 518 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 520 and one or more of the following modules may also be stored in the memory 516. The modules may be executed as foreground applications, background tasks, daemons, and so forth. The data store 520 may use a flat file, database, linked list, tree, executable code, script, or other data structure to store information. In some implementations, the data store 520 or a portion of the data store 520 may be distributed across one or more other devices including other devices 104, network attached storage devices, and so forth.

A communication module 522 may be configured to establish communications with one or more other devices 104, the application server 112, the distribution server 118, and so forth. The communications may be authenticated, encrypted, and so forth. For example, the event data 108 may be encrypted prior to transmission to the distribution server 118.

The memory 516 may store the one or more of the application modules 106 described above. For example, the application 106 may comprise a web browser, email client, point-of-sale application, and so forth. The application 106 may be configured to generate the event data 108. In one implementation, a separate application 106 may be configured to generate event data 108. In another implementation, a portion of the operating system module 518 may be used to generate the event data 108. The event data 108 may be stored at least in part in the data store 520.

The file 122 is received from an external device such as the distribution server 118, and may be stored in the data store 520. In some implementations the file 122 may comprise an executable program that may be executed to update or otherwise change at least a portion of the application 106 or the behavior of the application 106.

The data store 520 may be used to store one or more of configuration data 524. For example, the configuration data 524 may comprise settings for one or more of the applications 106. In some implementations, the file 122 may be configured to make changes to or otherwise modify the configuration data 524.

In some implementations, one or more of the modules may be stored at least in part in the memory 516 of other devices 104, may be executed at least in part on the other devices 104, and so forth.

Other modules 526 may also be present in the memory 516. For example, an authentication module may be used to authenticate the user 102 at the device 104.

Figure 6:
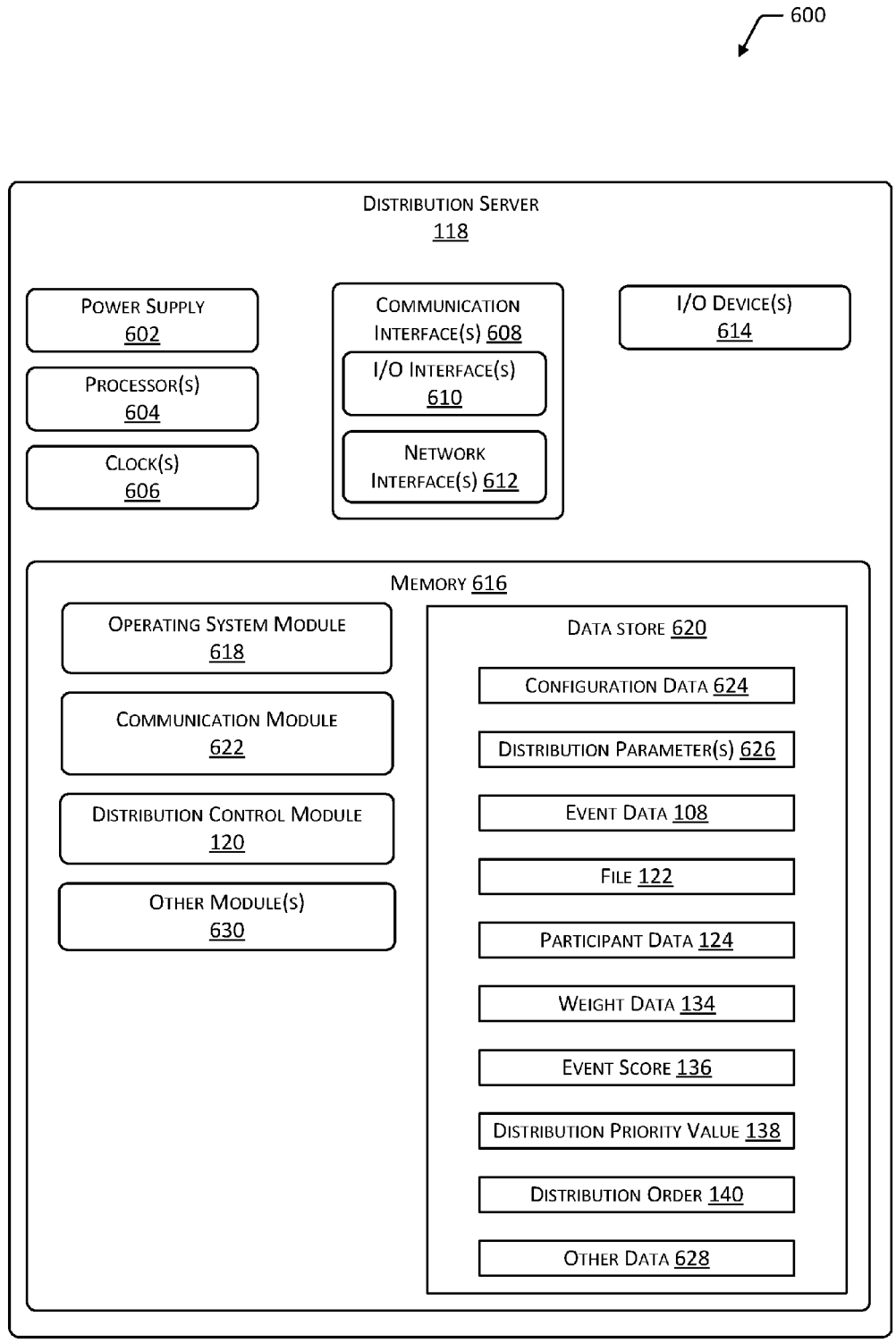
FIG. 6 is a block diagram of a distribution server within the scope of the present disclosure, according to one implementation.

FIG. 6 is a block diagram 600 of a distribution server 118 within the scope of the present disclosure, according to one implementation. The distribution server 118 may include one or more power supplies 602 may be configured to provide electrical power suitable for operating the components of the distribution server 118. In some implementations, the power supply 602 may include a rechargeable battery, fuel cell, photovoltaic cell, power conditioning circuitry, line power, and so forth.

The distribution server 118 may include one or more hardware processor(s) 604 (processors) configured to execute one or more stored instructions. The processor(s) 604 may include one or more cores. One or more clocks 606 may provide information indicative of date, time, ticks, and so forth. For example, the processor(s) 604 may use data from the clock 606 to generate a timestamp, trigger a preprogrammed action, determine the time associated with event data 108, and so forth.

The distribution server 118 may include one or more communication interfaces 608, such as input/output (I/O) interfaces 610, network interfaces 612, and so forth. The communication interface(s) 608 may enable the distribution server 118, or components of the distribution server 118, to communicate with other servers or components of the other devices. The I/O interface(s) 610 may include interfaces such as I2C, SPI bus, USB as promulgated by the USB Implementers Forum, RS-232, and so forth.

The I/O interface(s) 610 may couple to one or more I/O devices 614. The I/O devices 614 may include any manner of input device or output device associated with the distribution server 118. For example, I/O devices 614 may include touch sensors, keyboards, mouse devices, microphones, image sensors (e.g., cameras), scanners, displays, speakers, haptic devices, printers, and so forth. In some implementations, the I/O devices 614 may be physically incorporated with the distribution server 118 or may be externally placed.

The network interfaces 612 may be configured to provide communications between the distribution server 118 and other devices, such as the I/O devices 614, routers, access points, and so forth. The network interfaces 612 may include devices configured to couple to one or more networks including LANs, WLANs, WANs, wireless WANs, and so forth. For example, the network interfaces 612 may include devices compatible with Ethernet, asynchronous transfer mode (ATM), frame relay, Wi-Fi, Bluetooth, ZigBee, Z-Wave, 5G, 4G, LTE, and so forth.

The distribution server 118 may include one or more busses or other internal communications hardware or software that allows for the transfer of data between the various modules and components of the distribution server 118.

As shown in FIG. 6, the distribution server 118 may include one or more memories 616. The memory 616 may include one or more non-transitory CRSM. A few example modules are shown stored in the memory 616, although the same functionality may alternatively be implemented in hardware, firmware, or as a SoC.

The memory 616 may include one or more OS modules 618. The OS module 618 may be configured to manage hardware resource devices such as the I/O interfaces 610, the network interfaces 612, the I/O devices 614, and to provide various services to applications or modules executing on the processors 604. The OS module 618 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; a hypervisor, or other operating systems.

A data store 620 and one or more of the following modules may also be stored in the memory 616. The modules may be executed as foreground applications, background tasks, daemons, and so forth. The data store 620 may use a flat file, database, linked list, tree, executable code, script, or other data structure to store information. In some implementations, the data store 620 or a portion of the data store 620 may be distributed across one or more other devices including other servers, network attached storage devices, and so forth.

A communication module 622 may be configured to establish communications with one or more of the devices 104, the application server 112, and so forth. The communications may be authenticated, encrypted, and so forth. For example, the event data 108 may be decrypted after receipt from the device 104.

The memory 616 may store the distribution control module 120 such as described above. The distribution control module 120 may access information stored in the data store 620 during operation. Configuration data 624 stored in the data store 620 may specify one or more parameters used during the operation of distribution control module 120. The data store 620 may also store distribution parameters 626. As described above, the distribution parameters 626 may be used to modify the distribution order 140.

The data store 620 may also store the other information used by the district control module 120 such as described above. For example, the data store 620 may also store one or more of the event data 108, the file 122, the participant data 124, the weight data 134, the event score 136, the distribution priority value 138, the distribution order 140, or other data 628.

In some implementations, one or more of the modules may be stored at least in part in the memory 616 of other devices 104, may be executed at least in part on the other devices 104, and so forth.

Other modules 630 may also be present in the memory 616. For example, an account authorization module may be used to confirm that a particular user account or device 104 is permitted to receive the file 122.

Illustrative Processes

Figure 7:
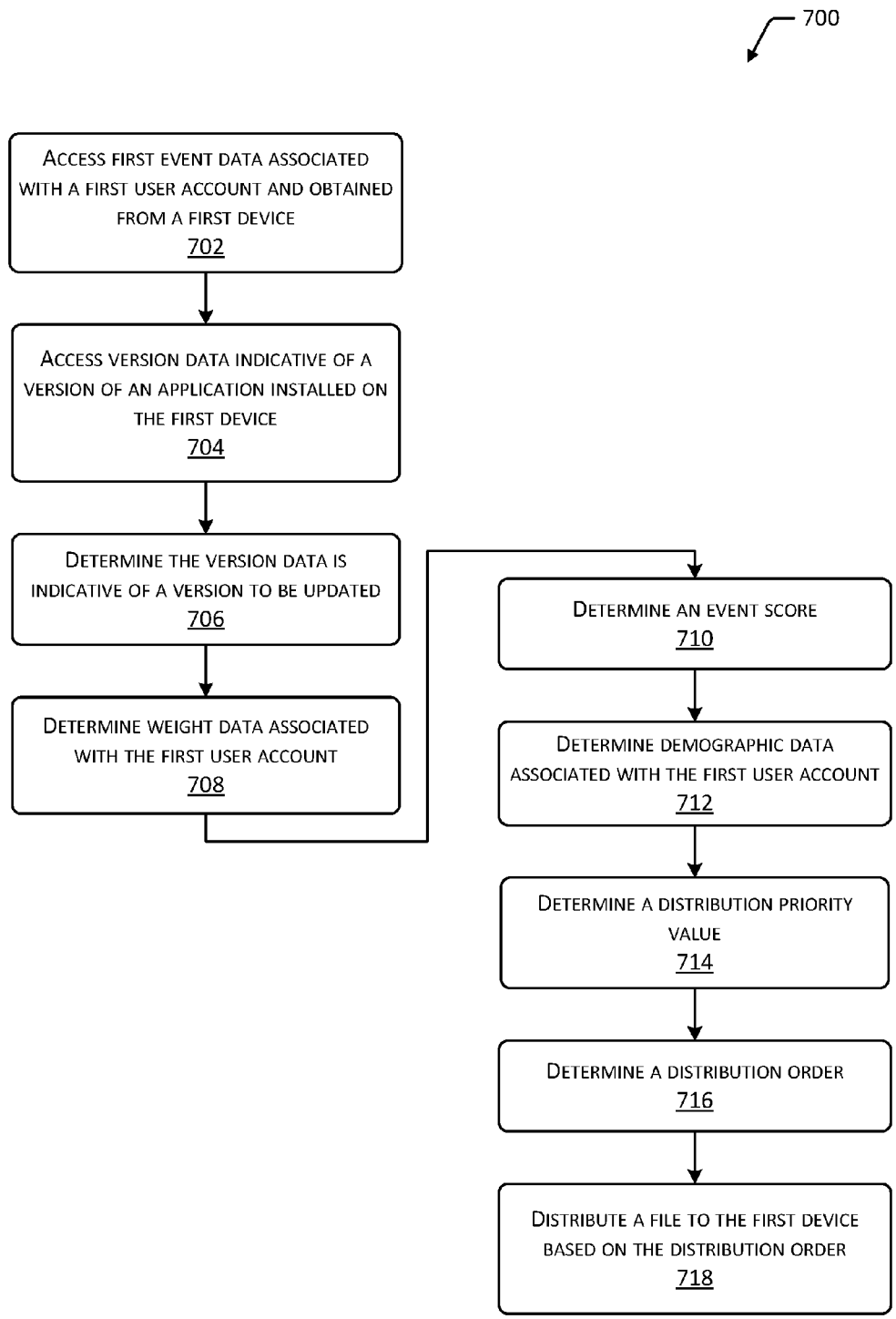
FIG. 7 illustrates a process to determine distribution order based on event data from a user account, according to one implementation.

FIG. 7 illustrates a process 700 to determine distribution order based on event data from a user account, according to one implementation. The process may be implemented at least in part by one or more of the distribution server 118, the application server 112, or the device 104.

At 702, first event data 108 obtained from a first device 104 is accessed. As described above, the event data 108 may comprise information indicative of one or more of a first user account associated with a first user or first application usage data 108(1). The first application usage data 108(1) may be indicative of a frequency of use of a first application function associated with the application 106 executing at least in part on the first device 104.

In some implementations, the event data 108 may include information associated with other applications 106 executing at least in part on the first device 104. For example, second application usage data 108(1) indicative of access to a second application function associated with a second application 106 executing at least in part on the first device 104 may be accessed.

In some implementations, the event data 108 may include information obtained from other devices 104. For example, second event data 108 obtained from a second device 104 may be accessed. The second event data 108 may comprise information indicative of one or more of the first user account associated with the first user or second application usage data 108(1) indicative of access to a second application function associated with the application 106 executing at least in part on the second device.

At 704, version data indicative of a version of an application 106 installed on the first device 104 is accessed. For example, the version data may be sent to the distribution server 118. In another example, the version data may be obtained from the application server 112.

At 706, the version data is determined to be indicative of a version to be updated. For example, comparison may be made between the version number of the application 106 is installed on the device 104 and a version number associated with the file 122.

At 708, weight data 134 associated with the first user account is determined. For example, a particular profile of weight values 206 for particular types of event data 204 associated with the first user account may be accessed.

At 710, an event score 136 is determined based on the event data 108. For example, the event score 136 may be determined based on the first application function and the frequency of use of the first application function specified in the event data 108. In some implementations, the event score may be based on the second application function and a frequency of use of the second application function is indicated in the event data 108.

In some implementations, the same user 102 may associate with the same user account and may access the same application but from different devices 104. For example, an email client may be accessed on both a smart phone and a tablet. A second event score 136 is determined based on use of the first application function on the second device 104.

At 712, demographic data 130 associated with the first user account is determined. For example, the demographic data 130 may be retrieved from the data store 620. As described above, the demographic data 130 may be indicative of at least one or more of: date the user account was established, age of the user, geographic location associated with the user, occupation of the user, or other information.

At 714, the distribution priority value 138 is determined based on the weight data 134 and the event score 136. For example, the distribution priority value 138 may be the product of the event score 136 and the weight value 206. In implementations where the second event score 136 is available, the distribution priority value 138 may be determined based at least in part on the second event score 136. In some implementations, the weight data 134 associated with second event data 136 may differ from that used with respect to the first event data 136.

In some implementations, the determination of the distribution priority value 138 may be further based on the demographic data 130. For example, a particular weight value 206 may be associated with a particular demographic category or grouping.

At 716 the distribution order 140 is determined. For example, the distribution control module 120 may sort the distribution priority values 138 in descending order, such that the greatest distribution priority value 138 is associated with a first sequence 208 number. Based on the distribution priority value 138, the first device 104 associated with the first user account may be preferentially designated with respect to a second user account to receive an update of the application 106 installed on the first device 104.

At 718 the file 122 is distributed to the first device 104 based on the distribution order 140. As described, the file 122 may comprise an update, patch, revision, rollback, and so forth for the application 106. For example, the file 122 may roll back the application 106 to an earlier version that has been determined to be more stable.

Figure 8:
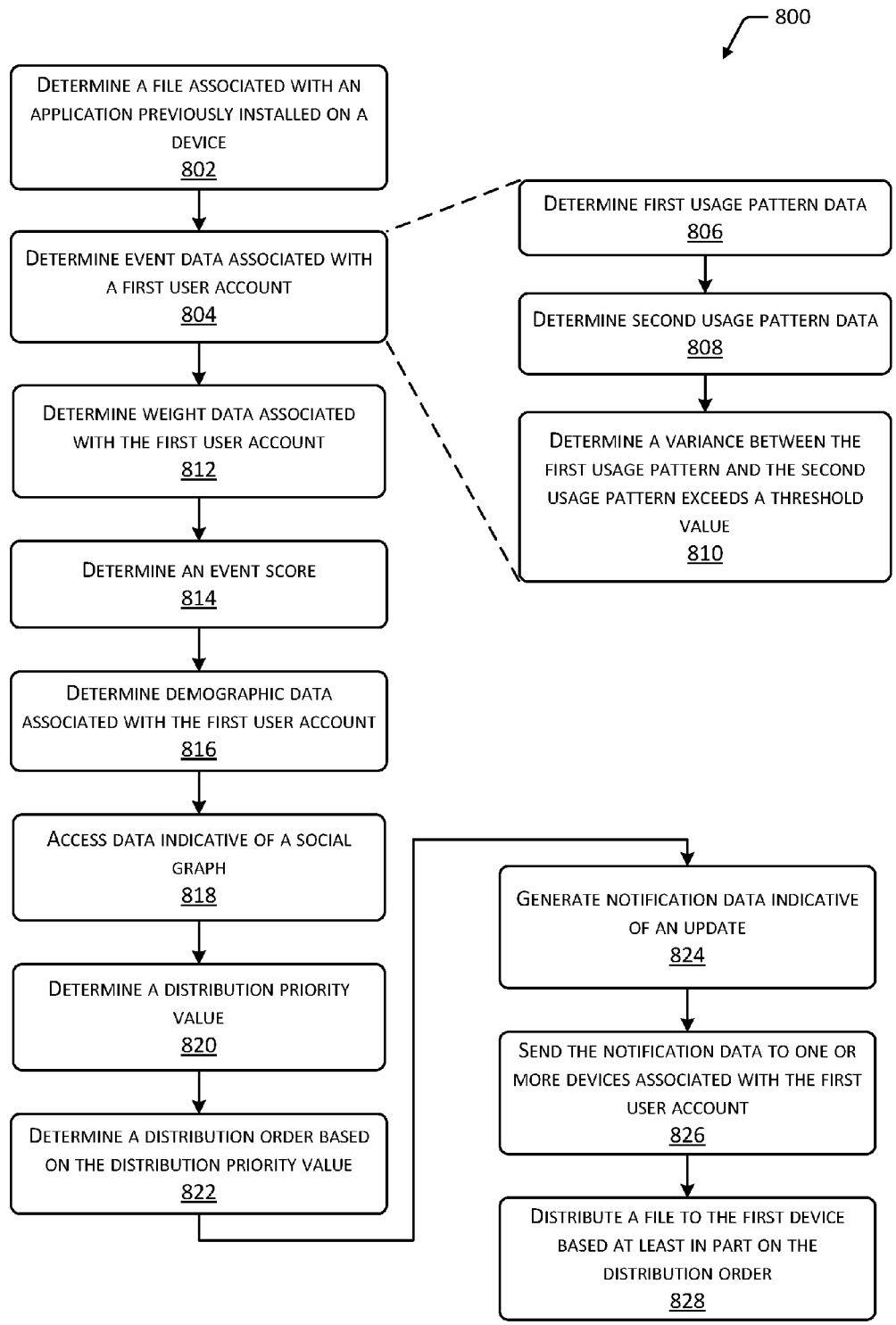
FIG. 8 illustrates another process to determine distribution order based on event data, according to one implementation.

FIG. 8 illustrates another process 800 to determine distribution order based on event data, according to one implementation. The process may be implemented at least in part by one or more of the distribution server 118, the application server 112, or the device 104.

At 802, a file associated with an application previously installed on a device 104 is determined. For example, the file 122 may comprise an update which is newly released. In some implementations, the device 104 may be associated with a first user account.

At 804, event data 108 associated with the first user account is determined. The event data 108 may be determined using a variety of techniques. One technique is described with regard to steps 806 through 808.

As described above, the event data 108 may include one or more of application usage data 108(1), device usage data 108(2) from one or more devices 104 associated with the first user account, geolocation data 108(3) associated with the device 104 associated with the first user account, sensor data 108(4) obtained from one or more sensors proximate to the device 104 associated with the first user account, network resource access data 108(5) indicative of access to a network resource, purchase history data 108(6) associated with the first user account, or other data 108(X).

At 806, first usage pattern data associated with the first user account is determined. For example, log data obtained by one or more of the application 106, another application 106, or the OS module 518 may be processed to determine a particular code path within the application 106 that was utilized. The code path may comprise information indicative of a particular sequence of user inputs, application outputs, register values, and so forth. At 808, second usage pattern data associated with the first user account is determined. At 810, a variance between the first usage pattern and the second usage pattern is determined to exceed a threshold value. For example, a comparison may indicate that the first usage pattern data and the second usage pattern data differ by more than a threshold value of 20% from one another. This variance may result in event data 108 that is deemed to be indicative of a change in the behavior of the user 102 with respect to the application 104.

At 812, weight data 134 associated with first user account may be determined. For example, the weight data 134 associated with the user 102 may be retrieved by the distribution server 118.

At 814, an event score 136 based at least in part on the event data 108 is determined. In some implementations, the event score 136 may be generated based on values associate with the event data 108 and the weight data 134.

In one implementation, the event data 108 may comprise a first type of event data 204 having a first value, and a second type of event data 204 having a second value. For example, the first type of event data 204 may be indicative of a "check for update" action and the second type of event data 204 may be indicative of a "close and immediate application restart" action. The first value may indicate "6", indicating 6 occurrences of the "check for update" action, while the second value may indicate "10", indicating 10 occurrences of the "close and immediate application restart" action.

The weight data 134 may be access that includes a first weight associated with the first type of event data 204 and a second weight associated with the second type of behavior weight data 204. For example, the first weight may have a value of "80" and the second weight have a value of "70". The event score 136 may comprise a summation of the products of the respective weights and values. For example, a first product may be generated by multiplying the first value with the first weight. A second product may be generated by multiplying the second value with the second weight. The event score 136 may be generated by summing the first product and the second product. Continuing the example: (6×80)+(10×70)=1180.

At 816, demographic data 130 associated with the first user account is determined.

At 818, social graph data 202 or other data indicative of a social graph may be accessed. For example, the social graph may include an entry associated with the first user account. A distance within the social graph between the first user account and a second user account may be determined. In some implementations, the determination of the distribution priority value 138 by operation 820 may be further based on the distance. In other implementations, the determination of the distribution priority value 138 may be based on other information obtained from the social graph.

At 820, a distribution priority value 138 is determined based on the event score 136. In some implementations, the distribution priority value 138 may also be determined using the weight data 134. In some implementations, the distribution priority value 138 may also be determined based at least in part on the social graph data 202.

At 822, a distribution order 140 of the file 122 is determined based at least in part on the distribution priority value.

At 824, notification data indicative of an update to the file 122 may be generated, based on the distribution order 140. For example, the notification data may comprise a message that the file 122 is available, or will be available for distribution.

At 826, the notification data may be sent to one or more devices 104 associated with the first user account. In some implementations the notification data may be sent using the distribution order 140.

At 828, a file 122 is distributed to the first device 104. In some implementations, distribution of the file 122 may be based at least in part on the distribution order 140. For example, the file 122 may be sent to the first device 104 and is associated with the first user account based at least in part on the distribution order 140. As described above, the file 122 may comprise an update to computer executable instructions previously stored in one or more memories of the device 104 or stored in one or more memories that are accessible to the device 104.

Figure 9:
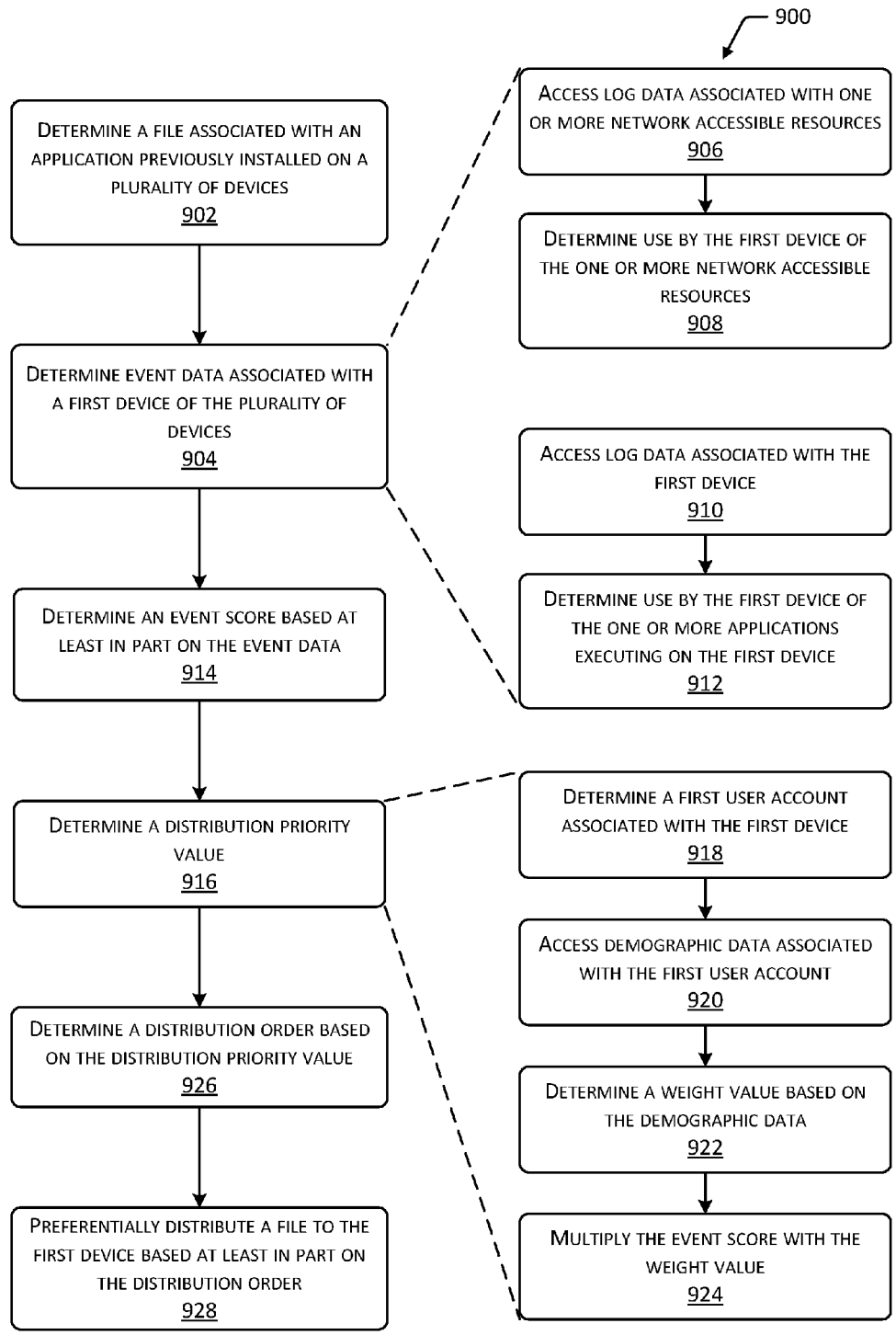
FIG. 9 illustrates another process to determine distribution order based on event data associated with a device, according to one implementation.

FIG. 9 illustrates another process 900 to determine distribution order based on event data 108 associated with a device, according to one implementation. The process may be implemented at least in part by one or more of the distribution server 118, the application server 112, or the device 104.

At 902, a file 122 is determined that is associated with an application 106 previously installed on the plurality of devices 104. For example, the file 122 may be designated as a new set of instructions or configuration information for the previously installed applications 106.

At 904, event data 108 associated with a first device 104 of a plurality of devices is determined. In one implementation, at 906, the event data 108 may be determined by accessing log data 116 associated with one or more network accessible resources. For example, the log data 116 from one or more application servers 112 may be obtained. At 908, use by the first device 104 of the one or more network accessible resources may then be determined based on the log data 116. For example, the log data 116 may be searched to look for the device identifier 210 associated with the device 104. Those corresponding entries may then be used to generate the event data 108.

In another implementation, the event data 108 may be based on information obtained from one or more of the devices 104. At 910, log data generated by the first device 104 over a time interval may be accessed. For example, the log data may be indicative of one or more of input received by one or more input devices of the first device, application execution statistics associated with one or more applications executing at least in part on the first device, or application programming interface calls made by one or more applications executing at least in part on the first device. Continuing the example, the input received by one or more input devices may comprise key presses, touches to touch sensor, vocal input, and so forth, associated with accessing one or more functions of the application 106. At 912, use by the first device 104 of the one or more applications 106 is determined based on the log data. For example, touch input that is associated with activating a control for the "check for update" function may indicate use of the "check for update" function by the user 102.

At 914, an event score 136 based at least in part on the event data 108 is determined. For example, the event score 136 may be determined as described above.

At 916, a distribution priority value 138 is determined based on the event score 136. For example, the distribution priority value 138 may be determined as described above. In some implementations, information about the user account may also be used to determine the distribution priority value 138. At 918, a first user account associated with the first device 104 may be determined. At 920, demographic data 130 associated with the first user account may be accessed. At 922, a weight value 206 based on the demographic data 130 may be determined. For example, the weight data 134 may associate a particular weight value 206 with a particular demographic attribute, category, and so forth. At 924, the distribution priority value 138 may be calculated by multiplying the event score 136 with the weight value 206.

At 926, a distribution order 140 of the file 122 to the plurality of devices 104 is determined based at least in part on the distribution priority value. As described above, the distribution parameters 626 may be used to determine the distribution order 140 in addition to the distribution priority value 138. In one implementation, the first device 104 may be determined to be associated with a first segment of the plurality of devices based on the event score 136. For example, devices 104 having an event score 136 that is above a threshold value may be designated as members of the priority segment 406. Similarly, devices 104 having an event score 136 that is below the threshold value may be designated as members of the non-priority segment 408. The distribution parameters 626 may comprise information such as a percentage, ratio, or integer value that indicates how many devices of the respective segments are to be included in distribution of the file 122. Continuing the example, the distribution parameters 626 may be accessed that indicate a particular ratio of first segment user devices to second segment user devices. The distribution control module 120 may use the distribution parameters 626, such as the particular ratio, to include second segment devices 104 in the distribution order 140 to maintain the ratio relative to the first segment devices. For example, members of the non-priority segment 408 may be interspersed into the distribution order 140 and had a desired ratio.

At 928, the file 122 is preferentially distributed to the first device 104 of the plurality of devices 104(D) based on the distribution order 140. As described above, the file 122 may comprise an update to computer-executable instructions previously stored at least in part by the first device 104.

The processes described above may in some implementations be used in conjunction with one another. For example, event data associated with user accounts and devices may be utilized to determine the distribution order 140.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors configured to execute the computer-executable instructions to:
access first event data obtained from a first device, wherein the first event data comprises information indicative of:
a first user account associated with a first user, and
first application usage data indicative of a frequency of use of a first application function associated with the application executing at least in part on the first device;
access version data indicative of a version of an application installed on the first device;
determine the version data is indicative of a version to be updated;
determine weight data associated with the first user account;
determine an event score based on the first application function and the frequency of use of the first application function;
based on the weight data and the event score, determine a distribution priority value; and
based on the distribution priority value, designate the first device associated with the first user account preferentially with respect to a second user account to receive an update of the application installed on the first device.

2. The system of claim 1, wherein the first event data further comprises information indicative of:
second application usage data indicative of access to a second application function associated with a second application executing at least in part on the first device; and
further comprising computer-executable instructions to:
determine the event score based on the second application function and a frequency of use of the second application function.

3. The system of claim 1, further comprising computer-executable instructions to:
access second event data obtained from a second device, wherein the second event data comprises information indicative of:
the first user account associated with a first user; and
second application usage data indicative of access to a second application function associated with the application executing at least in part on the second device;
determine a second event score based on use of the first application function on the second device; and
wherein the distribution priority value is further based at least in part on the second event score.

4. The system of claim 1, further comprising computer-executable instructions to:
determine demographic data associated with the first user account, wherein the demographic data is indicative of at least one or more of:
date the first user account was established,
age of the first user,
geographic location associated with the first user, or
occupation of the first user; and
wherein the determination of the distribution priority value is further based on the demographic data.

5. A system comprising:
one or more memories storing computer-executable instructions; and
one or more hardware processors configured to execute the computer-executable instructions to:

determine a file associated with an application previously installed on a device associated with a first user account;

determine event data associated with execution of the application;

determine an event score based at least in part on the event data;

determine weight data associated with demographic data associated with the device;

determine a distribution priority value based on the event score and the weight data; and determine a distribution order of the file based at least in part on the distribution priority value, wherein the file is configured to modify the application as previously installed on the device.

6. The system of claim 5, wherein the computer-executable instructions to determine the event data further comprise computer-executable instructions to:

determine first usage pattern data associated with the first user account;

determine second usage pattern data associated with the first user account; and determine a variance between the first usage pattern and the second usage pattern exceeds a threshold value.

7. The system of claim 5, wherein the event data comprises information indicative of one or more of:

usage of one or more applications associated with the first user account, usage of one or more devices associated with the first user account, geolocation data associated with the device associated with the first user account, sensor data obtained from one or more sensors proximate to the device associated with the first user account, or purchase history associated with the first user account.

8. The system of claim 5, wherein the event data comprises information indicative of access to a network resource using credentials associated with the first user account.

9. The system of claim 5, wherein the event data comprises:

a first type of event data having a first value, and a second type of event data having a second value; and further comprising computer-executable instructions to:

access weight data comprising:

a first weight associated with the first type of event data, and a second weight associated with the second type of event data; and wherein the instructions to determine the event score comprise instructions to:

generate a first product by multiplying the first value with the first weight, generate a second product by multiplying the second value with the second weight; and generate the event score by summing the first product and the second product.

10. The system of claim 5, wherein the file comprises an update to computer-executable instructions previously stored in the one or more memories.

11. The system of claim 5, further comprising computer-executable instructions to:

send the file to a first device associated with the first user account based at least in part on the distribution order.

12. The system of claim 5, further comprising computer-executable instructions to:

access data indicative of a social graph, wherein the social graph includes an entry associated with the first user account;

determine a distance in the social graph between the first user account and a second user account; and wherein the determination of the distribution priority value is further based on the distance.

13. The system of claim 5, further comprising computer-executable instructions to:

generate notification data indicative of an update based on the distribution order; and send the notification data to one or more devices associated with the first user account.

14. A method of determining a distribution order of a file to a plurality of devices, the method comprising:

determining the file is associated with an application previously installed on the plurality of devices;

determining event data associated with a first device of the plurality of devices;

determining an event score based at least in part on the event data;

determining weight data associated with a user account for each of the plurality of devices;

determining a distribution priority value based on the event score and the weight data; and determining a distribution order of the file to the plurality of devices based at least in part on the distribution priority value.

15. The method of claim 14, further comprising:

preferentially distributing the file to the first device of the plurality of devices based on the distribution order.

16. The method of claim 14, wherein the plurality of devices comprises one or more of robots or drones, and further wherein the file comprises an update to computer-executable instructions of the application previously stored at least in part by the first device.

17. The method of claim 14, wherein determining the event data further comprises:

accessing log data associated with one or more network accessible resources; and determining use by the first device of the one or more network accessible resources based on the log data.

18. The method of claim 14, where determining the event data further comprises:

accessing log data generated by the first device over a time interval, wherein the log data is indicative of one or more of:

input received by one or more input devices of the first device, application execution statistics associated with one or more applications executing at least in part on the first device, or application programming interface calls made by one or more applications executing at least in part on the first device; and determining use by the first device of the one or more applications based on the log data.

19. The method of claim 14, wherein determining the distribution priority value further comprises:

determining a first user account associated with the first device;

accessing demographic data associated with the first user account;

determining a weight value based on the demographic data; and multiplying the event score with the weight value.

20. The method of claim 14, further comprising:

determining, based on the event score, the first device is associated with a first segment of the plurality of devices;

determining a second segment comprising user devices having event scores less than a threshold value;
accessing a distribution parameter indicative of a ratio of first segment user devices to second segment user devices; and
wherein determining the distribution order further comprises including second segment devices in the distribution order to maintain the ratio relative to the first segment devices.

* * * * *